Oct. 1, 1957 D. S. BARLOW ET AL 2,808,459

IDENTIFIER-TRANSLATOR

Filed Dec. 5, 1955 8 Sheets-Sheet 1

INVENTORS D. S. BARLOW
G. B. CROFUTT, JR.
BY [signature]
ATTORNEY

INVENTORS D. S. BARLOW
G. B. CROFUTT, JR.
BY
ATTORNEY

Oct. 1, 1957 D. S. BARLOW ET AL 2,808,459

IDENTIFIER-TRANSLATOR

Filed Dec. 5, 1955 8 Sheets-Sheet 3

INVENTORS D. S. BARLOW
G. B. CROFUTT, JR.
BY
ATTORNEY

INVENTORS D. S. BARLOW
G. B. CROFUTT, JR.
BY
ATTORNEY

INVENTORS D. S. BARLOW
G. B. CROFUTT, JR.
BY
ATTORNEY

INVENTORS D. S. BARLOW
G. B. CROFUTT, JR.
BY
ATTORNEY

INVENTORS D. S. BARLOW
G. B. CROFUTT, JR.
BY
ATTORNEY

Oct. 1, 1957 D. S. BARLOW ET AL 2,808,459
IDENTIFIER-TRANSLATOR
Filed Dec. 5, 1955 8 Sheets-Sheet 8

INVENTORS D. S. BARLOW
G. B. CROFUTT, JR.
BY
ATTORNEY

United States Patent Office 2,808,459
Patented Oct. 1, 1957

2,808,459

IDENTIFIER-TRANSLATOR

Dick S. Barlow, Redondo Beach, Calif., and George B. Crofutt, Jr., Verona, N. J., assignors to Bell Telephone Laboratories, Incorporated, New York, N. Y., a corporation of New York Application December 5, 1955, Serial No. 550,937

13 Claims. (Cl. 179—18)

This invention relates to identifying and translating devices, and particularly to apparatus for deriving equipment location designations of telephone stations and other specific data which may be useful in telephony or for other purposes. More particularly, the invention is in the nature of an improvement over the arrangements described in Patent No. 2,749,387 to D. S. Barlow and G. B. Crofutt, Jr., issued on June 5, 1956.

The above-referred to patent discloses a telephone line identifier capable of automatically identifying the directory number of a calling station. Although completely operative in its intended usage as a directory number identifier, this apparatus is not arranged for determining the associated equipment location designation of the telephone line, or number and type of ringing current if the directory number is already available.

An object of this invention, therefore, is to provide for the derivation of the associated equipment number when the directory number alone is available, as is the case on incoming calls.

An additional object of this invention is to provide simultaneous identification of both the equipment and the directory number of a telephone station for originating calls.

A further object of this invention is to provide for the detection of an idle line to a private branch exchange.

The invention accomplishes these and other objects by providing two separate but interconnected arrangements for identifying equipment and directory number designations. Means are provided for obtaining ingress to a directory number network matrix at a particular crosspoint designating the directory number to be translated. All other crosspoints are simultaneously grounded to prevent interference with the translation. A high frequency signal source is then applied to the designated crosspoint, which signal may be subsequently detected in a separate equipment number network matrix for determining the associated equipment number.

A feature of this invention includes apparatus for detecting and selecting an idle private branch exchange or P. B. X line. This apparatus includes means for successively neutralizing, or grounding, all of the idle P. B. X line equipment terminals in the equipment number matrix except the one to be selected.

The universal application of this invention may be noted from the features of complete identification and translation services that it provides for a telephone central office both on originating and incoming calls. On originating calls, the apparatus is adapted to provide identification of the directory number, class of service and the equipment number of the calling party simultaneously.

With respect to incoming calls, where the called line directory number is registered in a sender, the equipment number of the called party as well as the type of ringing current required, both of which are essential to the establishment of a connection to the called party, are obtained through the translation of the corresponding directory number.

These and other objects and features of the invention will be more readily understood from the following specification and attached drawings in which.

Figure 5:
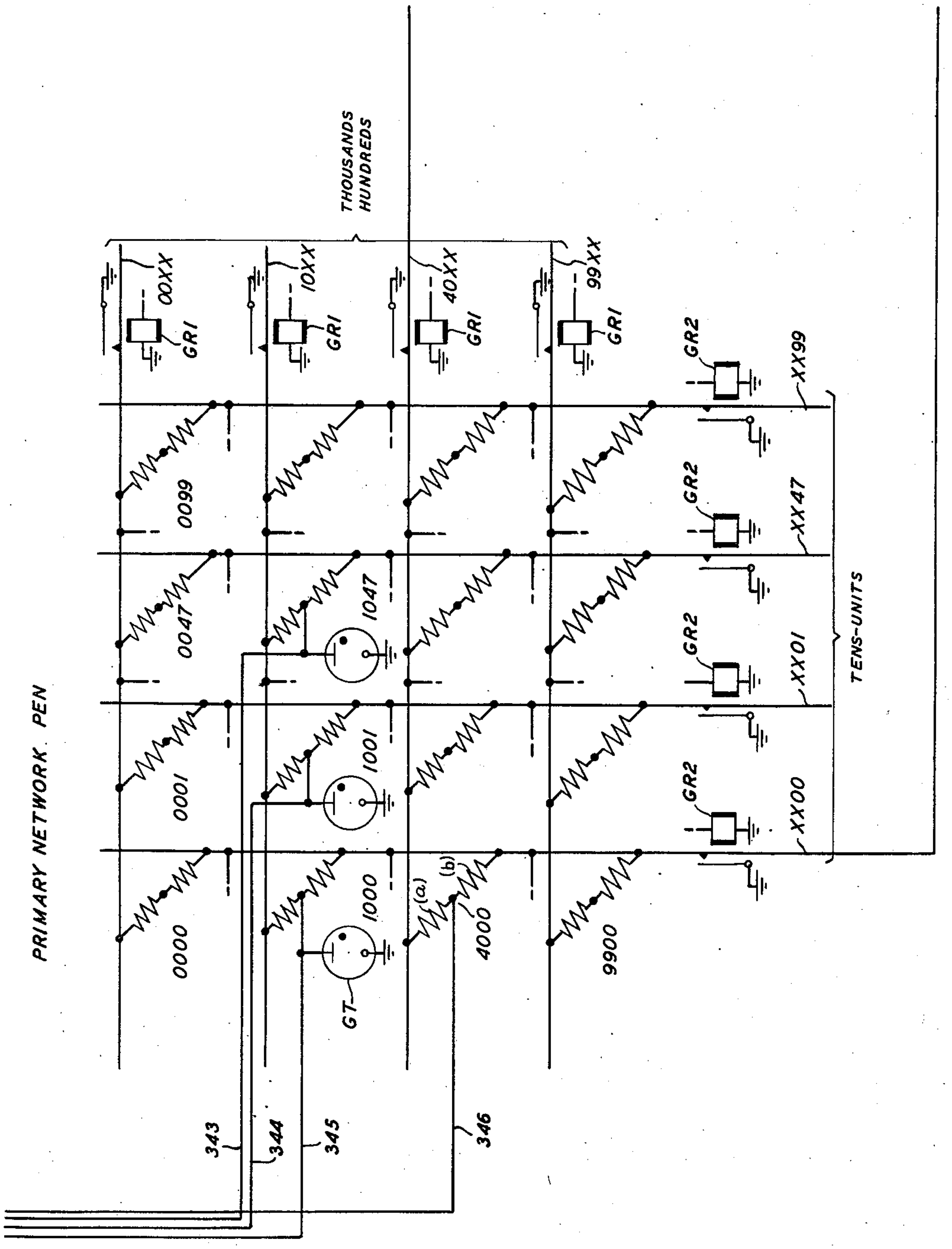
Fig. 5 shows in detail a primary network associated with the equipment number terminals of Fig. 1.
Figure 6:
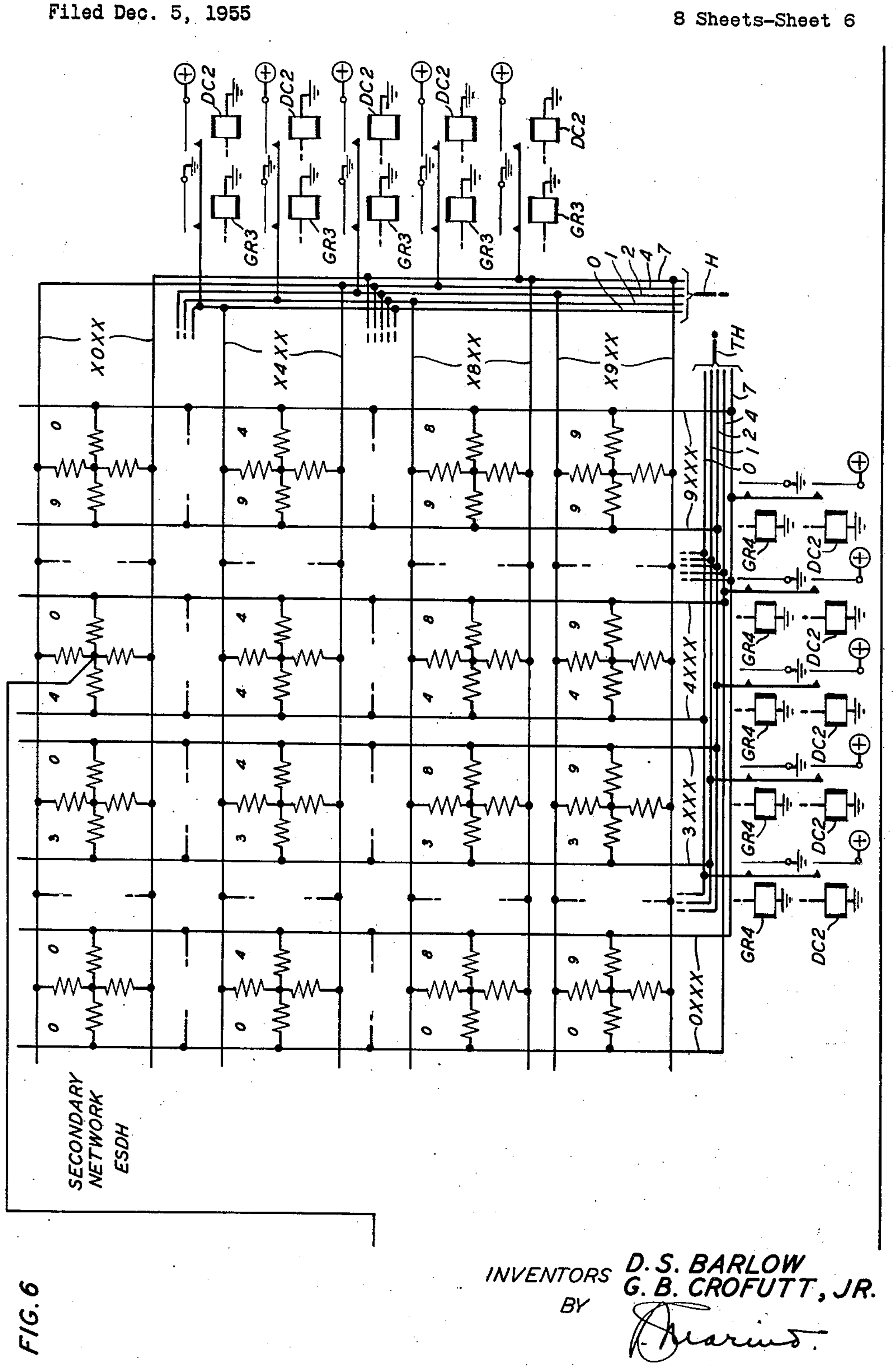
Figure 7:
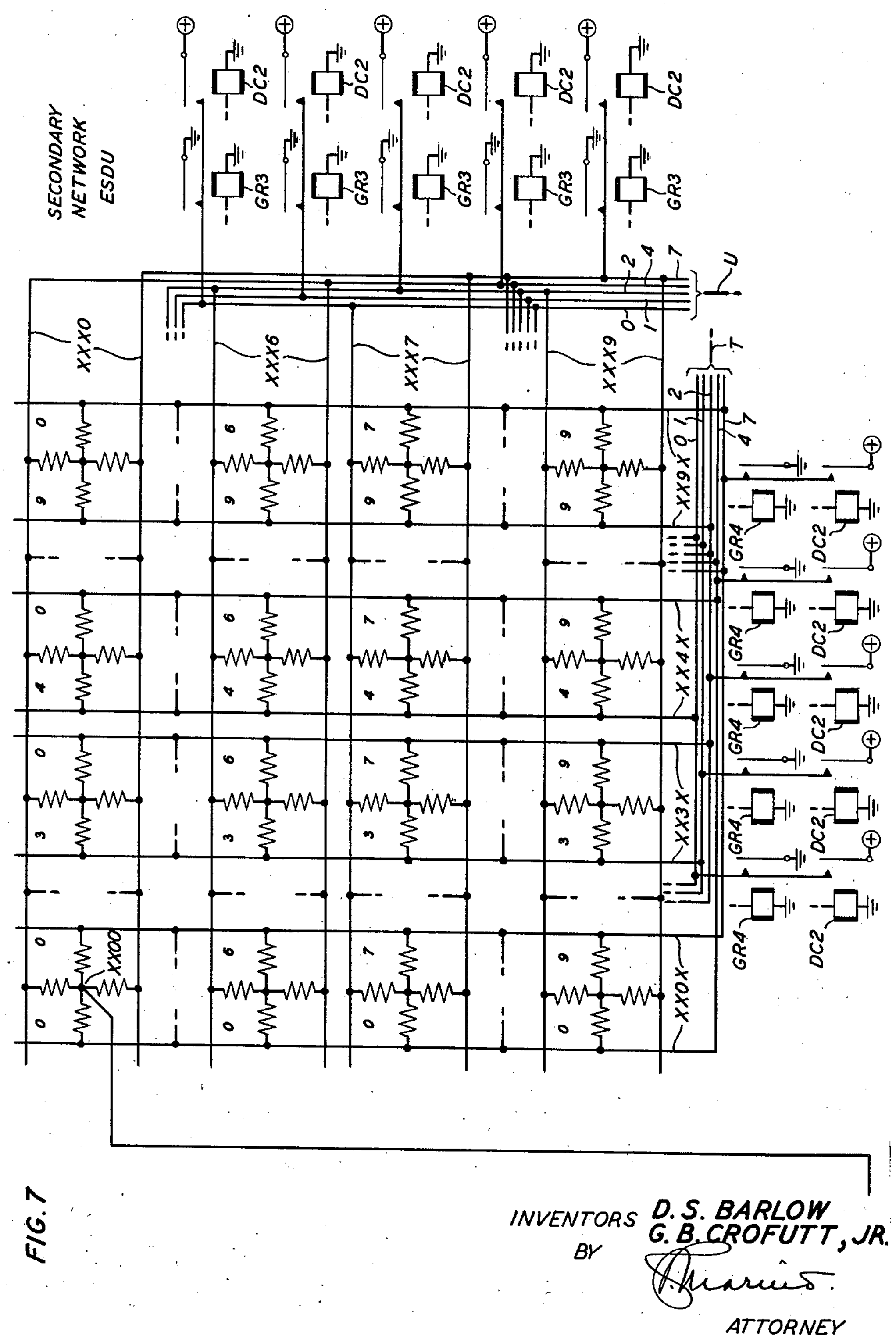
Figures 8, 9, 10:
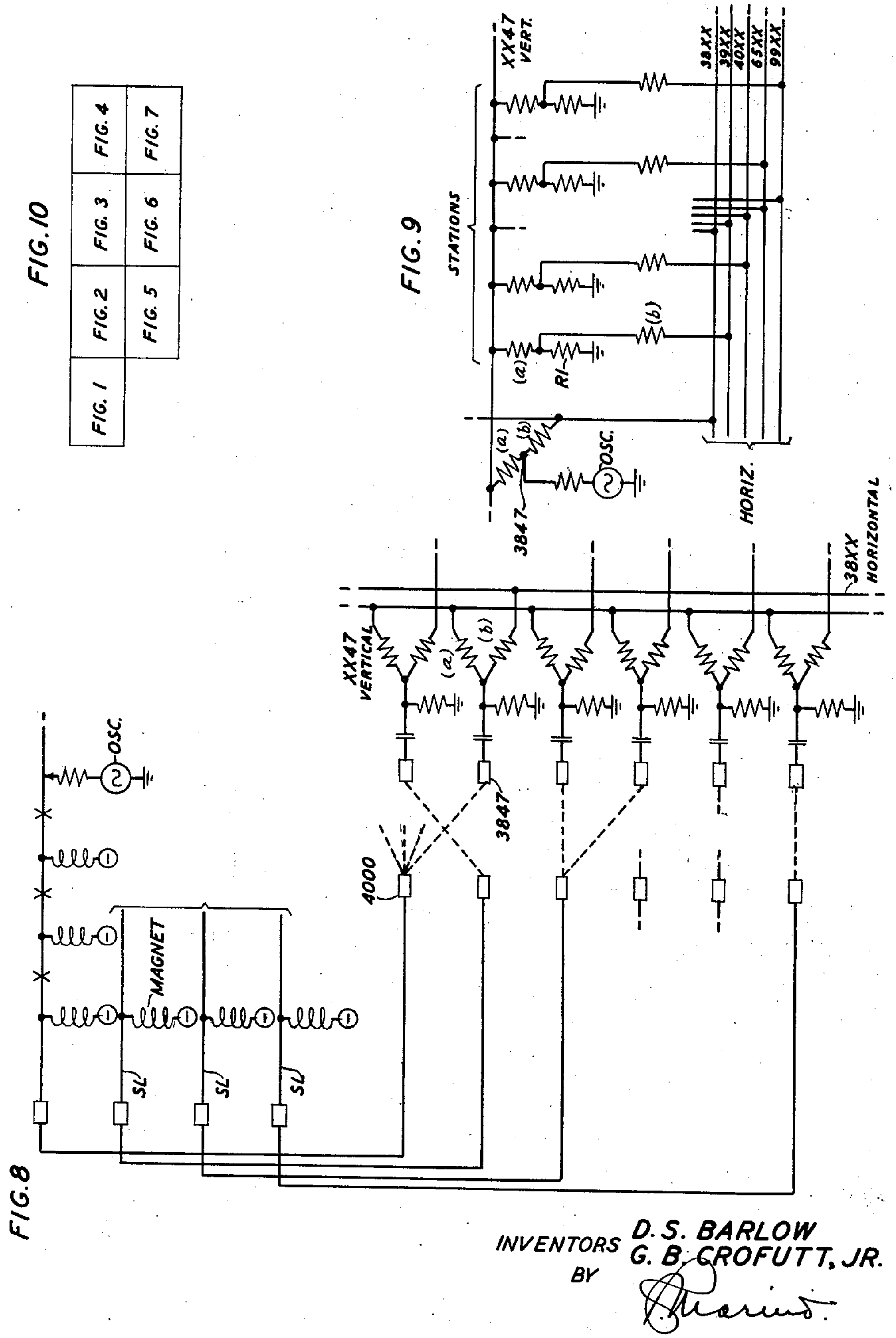

Fig. 6 indicates a secondary network connected with the horizontal elements of the primary network of Fig. 5;

Fig. 7 indicates a secondary network connected with the vertical elements of the network of Fig. 5;

Fig. 8 is a condensed circuit diagram arranged to aid in disclosing certain electrical characteristics of a primary network;

Fig. 9 is a condensed arrangement of a portion of a primary network to better disclose certain other characteristics of said network; and Fig. 10 shows the manner in which Figs. 1 to 7, inclusive should be arranged.

Figure 1:
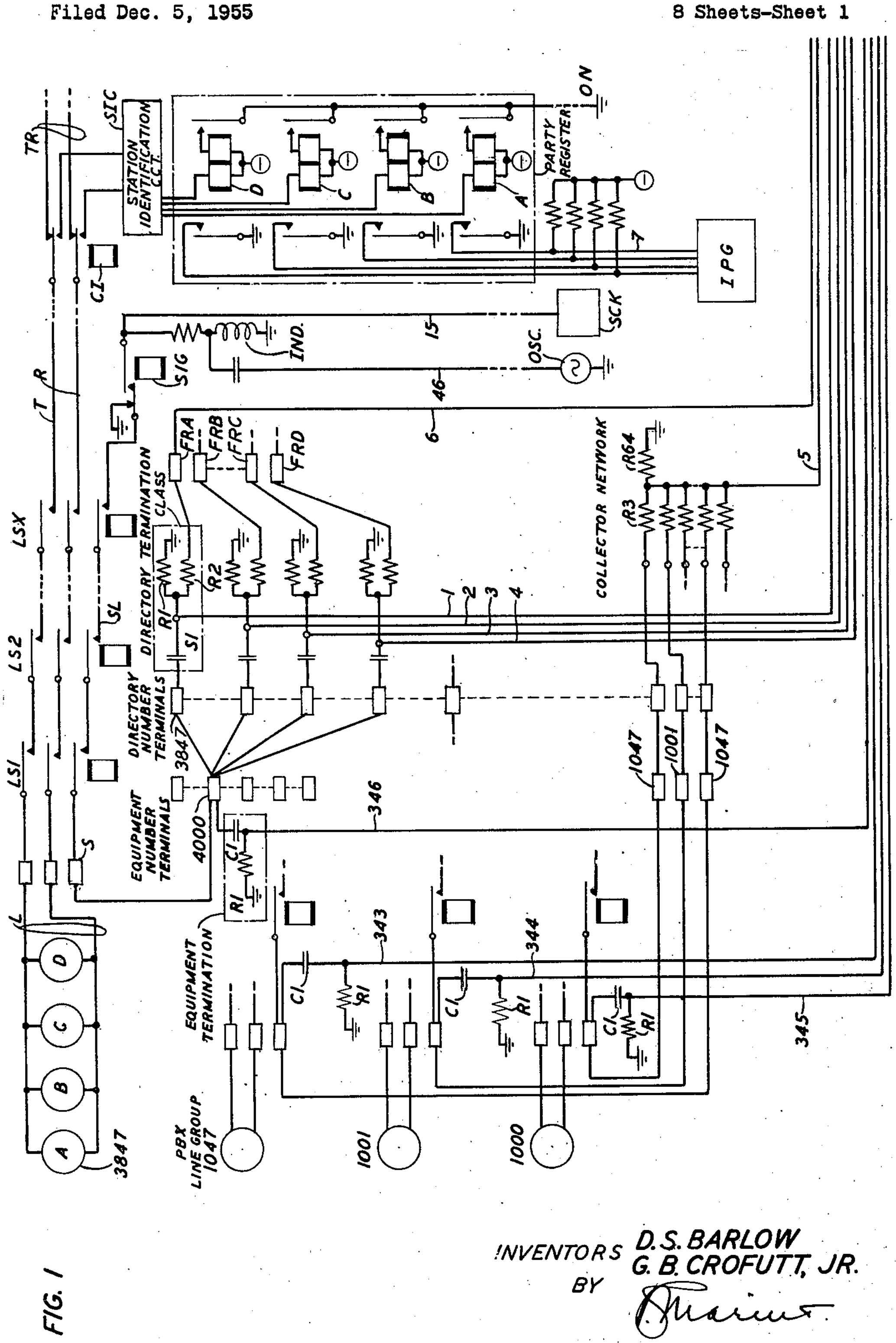
Fig. 1 shows a telephone line including four parties or stations connected thereto, a station identification circuit for determining which of the four parties is employing the facilities, a switching train for extending the line to a trunk, a private branch exchange group, equipment and directory number terminals and connections therebetween.

Fig. 1 shows a telephone line L connected to the terminals of a switch LS7 in a central office. Four telephone stations, or parties, are connected to the line L, each of the stations A, B, C and D having a unique directory number individual thereto. For exemplary purposes it has been assumed that station A has the directory number 3847 individual thereto and an equipment location designation, or number, 4000, shared in common with stations B, C and D.

When a call is originated on the line L by station A, for example, the line is extended in the conventional manner by line switches LS1, LS2, and LSX, which may be any appropriate construction, to the trunk TR from which the connection is then further extended by a register sender (not shown) in accordance with the dialed called office code registered therein. Since the manner in which the line L is so extended is not essential to the understanding of the present invention, the apparatus for effecting the extension will not be described.

Fig. 1 also shows a station identification circuit SIC—which, when relay CI is operated, is connected to the tip and ring conductors T and R of the trunk. The circuit SIC may be of the type disclosed in Patent No. 2,306,173 issued to M. A. Logan on December 22, 1942, its purpose being to determine which of the stations A, B, C or D has originated a call. When the determination has been made, the party identification of the calling station is registered by the operation of one of the four relays A, B, C or D. The latter constitutes a party register which is either temporarily associated with the trunk for the time taken to identify the directory number of a calling station as set forth in the above-referred to patent of D. S. Barlow and G. B. Crofutt, Jr., or is permanently associated therewith. Thus for example, if the call is originated by station A, the station identification circuit SIC will determine the fact and cause the operation of relay A of the party register, which relay when operated, locks to off-normal ground over its locking winding to perform additional functions later described. In the same manner, if the call is originated by stations B, C or D the appropriate station identification will be made and cause the operations of relays B, C or D, respectively, in the party register.

The sleeve terminal S of the line is connected by a conductor to a terminal 4000 (for the line L) in an equipment number terminal group indicated in Fig. 1 by the vertical column of terminals under the legend Equipment Number Terminal. This terminal 4000 indicates the equipment location of the line L on the line switch LS1. If the telephone exchange in which the invention is to be practiced has a capacity of 10,000 lines, there would be up to 10,000 terminals in the equipment number terminal group, each terminal in the group designating a particular location on the terminal banks or contacts of the line switches on which a line is terminated.

In some automatic telephone exchanges, particularly those in which the lines terminate on non-numerical switches of the crossbar types, for example, there is no correlation between the equipment number termination of a line and the directory number assigned to the station on the line, or, if there be more than one station on the line, to the directory numbers of the several stations thereon. It is necessary, however, for each directory number assigned to a station to be correlated with the equipment location number of the line to which the station is connected. Since this correlation is an arbitrary one, it may be established by suitable cross-connections between the equipment number terminals and another group of cross-connecting terminals which, in Fig. 1, is illustrated by the vertical column of terminals under the legend Directory Number Terminal. Each of the lines in the central office is connected to its associated equipment number terminal which, in turn, is cross-connected to the diretcory number terminal.

Thus, for example, terminals of line L which have been assumed to have an equivalent location number of 4000 is extended by a conductor to equipment number terminal 4000. Line L however, is provided with four stations A, B, C and D of which it has been assumed that station A has the directory number 3847. Accordingly, a conductor is extended from equipment location terminal 4000 to directory number terminal 3847. In the same manner, three other conductors, one for each of the other three stations B, C and D, extend from equipment number terminal 4000 to three other directory number terminals in accordance with the directory numbers severally assigned to stations B, C, and D. From the equipment terminal 4000 of line L an additional conductor 346 is extended through a termination network R1 and C1, explained herein, to terminal 4000 of the primary network PEN of Fig. 5. The structure and function of this primary network and that of Fig. 2 and the associated secondary networks also will be described herein.

The wiring arrangement of the equipment number and directory number terminals for the lines of a P. B. X (private branch exchange) permit the identification of the one directory number to which a call is to be charged independent of the particular line in the group that initiates the call. For this purpose, all the directory number terminals of the P. B. X line group in Fig. 1 are extended to a collector network comprising a resistor R3 for each terminal, connected in parallel to a grounded common resistor R64, from which a conductor 5 is further extended into primary network PDN–A shown in Fig. 2. As described herein, conductor 5 is connected to a passive element 1100 in primary network PDN–A, thereby indicating that the directory number to which calls made from a line in the P. B. X group are to be charged is directory number 1100, which is the number identified whenever a line in said P. B. X group originates a call.

Additional connections from the equipment number terminals of each of the P. B. X line group stations 1000, 1001 and 1047 are made to corresponding circuit designations in the primary equipment number network PEN of Fig. 5, over conductors 345, 344 and 343.

It may be seen from the above that the wiring arrangement of Fig. 1 provides one identifying terminal individual to each of the directory numbers of the subscriber stations in the office, and one identifying conductor for all of the lines of the P. B. X group. Also, as was pointed out in the above-mentioned Barlow-Crofutt patent, if a source of alternating potential is applied to the sleeve conductor SL, a circuit would be completed through each of the directory termination networks of Fig.1. The potential available in each of the four conductors 1, 2, 3 and 4, or if the call originated on a line of the P. B. X group, the potential available on the conductor 5, common to the group, may be utilized for purposes of directory number identification. As referred to herein, the signal power source is an oscillator OSC indicated schematically in Figs. 1 and 8 which, at the appropriate time, is applied to the sleeve conductor SL of the connection through the contacts of relay SIG (Fig. 1) which is operated by any suitable means at the required time.

Figure 2:
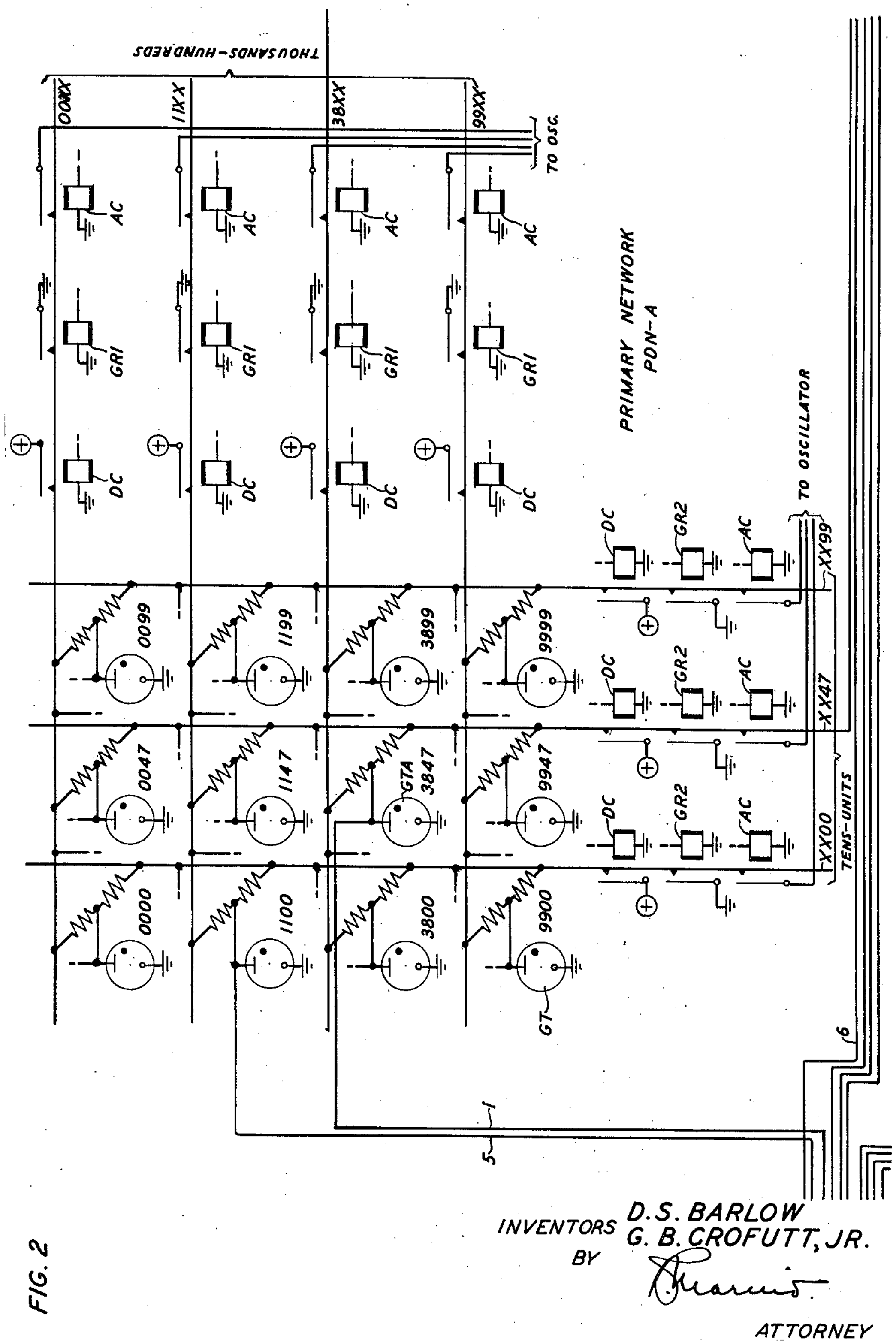
Fig. 2 shows in detail a primary network of passive electrical elements associated with the directory number terminals of Fig. 1, means for grounding a center terminal in certain of said passive elements, means for applying a direct-current voltage in certain others, and means for applying a high frequency signal to a selected passive element.
Figure 3:
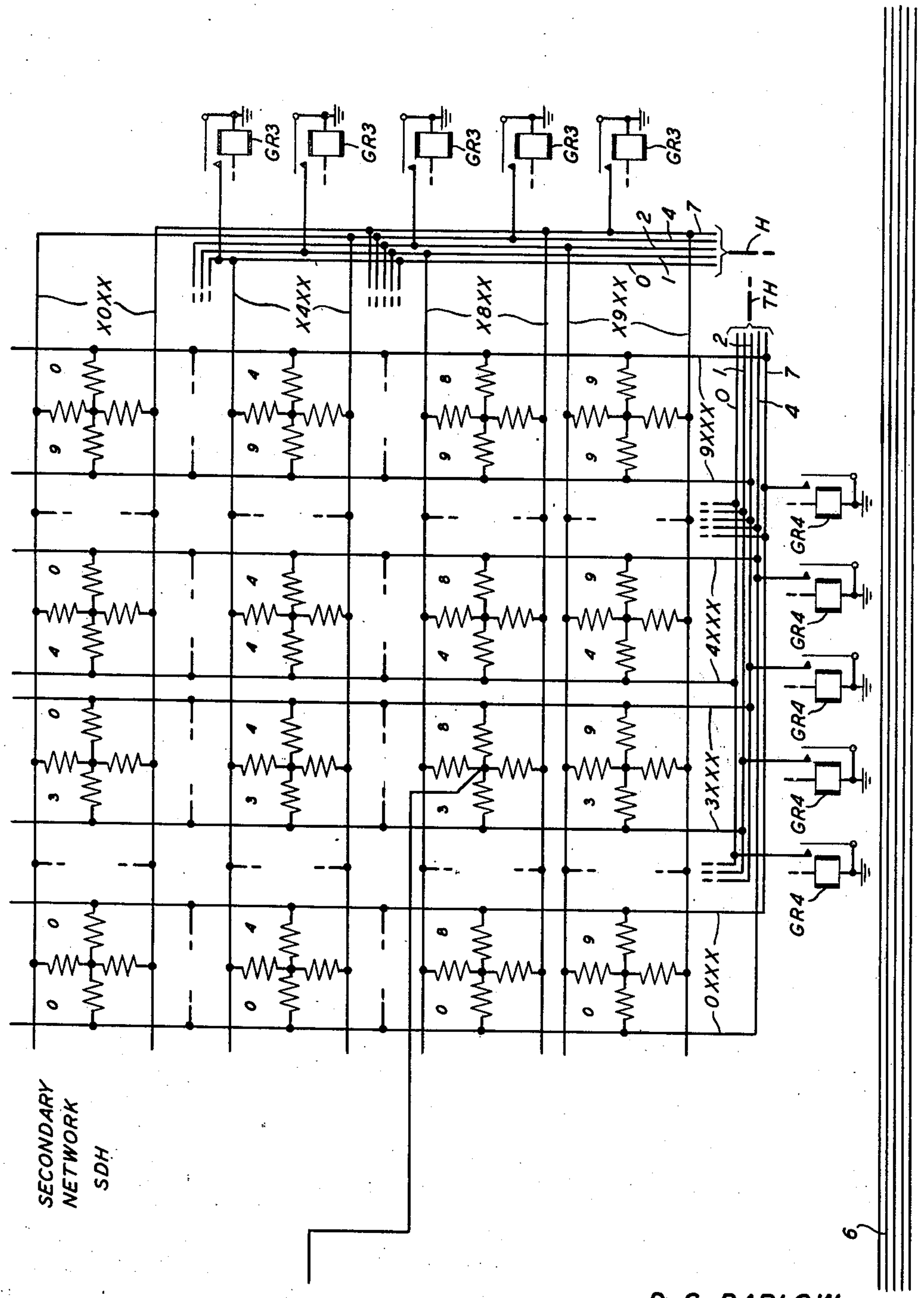
Fig. 3 shows a secondary network associated with the horizontal elements of the primary network of Fig. 2.
Figure 4:
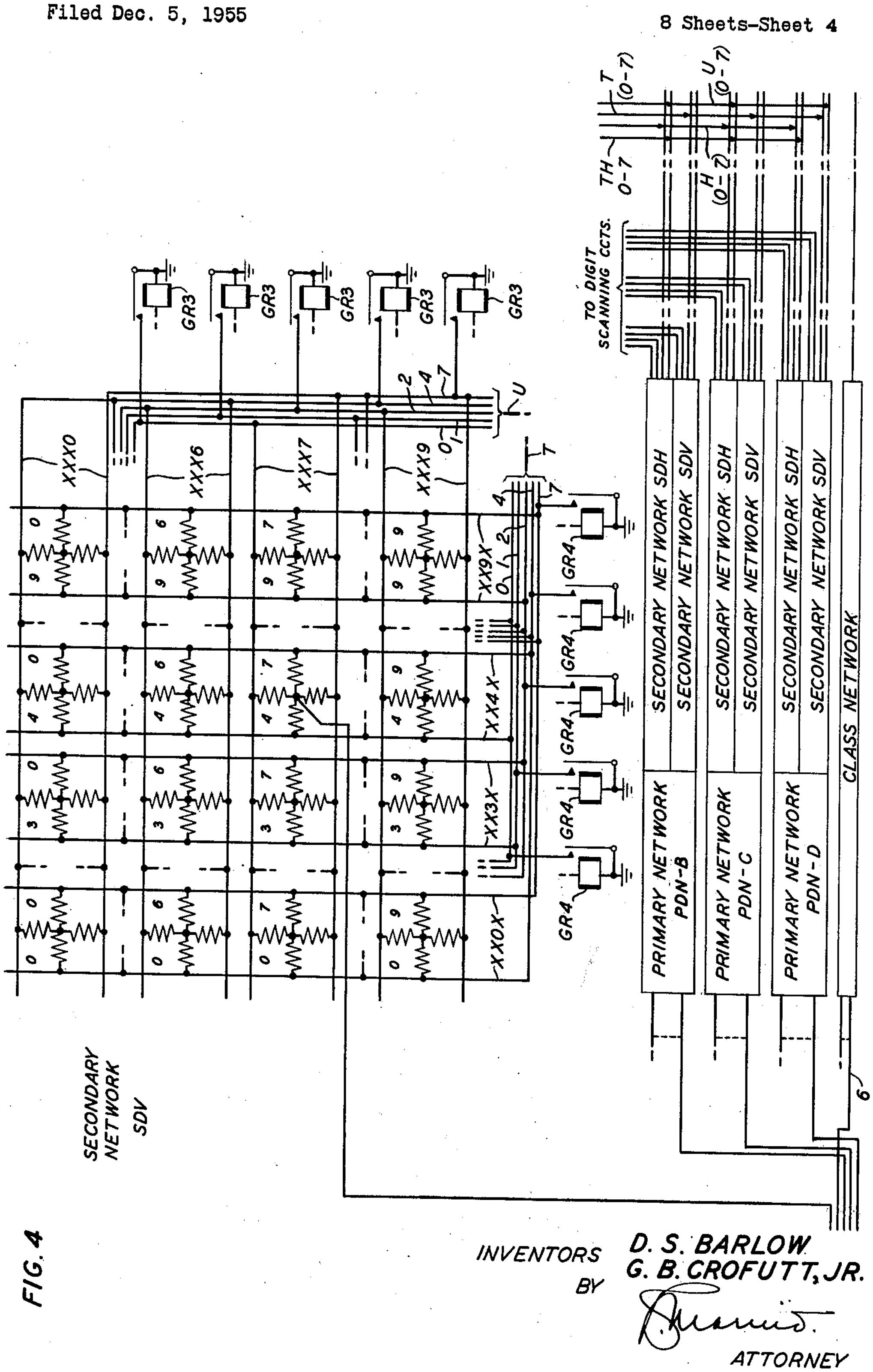
Fig. 4 shows a secondary network associated with the vertical elements of the primary network of Fig. 2, and also the three additional primary networks and their six associated secondary networks and further, a class network.

Fig. 2 shows an arrangement of one of the primary networks PDN–A, the other three PDN–B, PDN–C and PDN–D being indicated in the lower portion of Fig. 4. The number of primary networks provided in an exchang depends upon the largest number of subscriber stations which are connected to any one line. It is assumed in this embodiment that the four stations A, B, C and D on the line L represent the maximum number of stations on a line. Acordingly, one primary directory number network PDN–A and two associated secondary networks SDV (Fig. 4) and SDH (Fig. 3) are provided for all stations in the exchange corresponding to station A, similar arrangements being provided for stations B, C and D, respectively. Connected to each of the common terminals of each of the passive elements in the primary networks PDN– is a gas diode GT adapted when ionized to ground said common terminal. Means to be described herein are used to selectively energize all of the gas tubes in the primary networks PDN except one, preparatory to translating a particular directory number to its associated equipment number.

A separate primary network PEN similar in some respects to that of Fig. 2 is shown in Fig. 5. In this primary network, however, a gas diode is connected to the mid-points of each of the coupling networks, or passive elements, which are associated with the lines of the P. B. X group only. Through selective energization of these gas diodes, an idle private branch exchange line may be determined by means to be explained herein.

This network (Fig. 5) represents all of the equipment numbers in a central office regardless of the number of stations associated with a particular telephone line. In the embodiment illustrated, primary network PEN alone services all of the primary directory number networks PDN–A, PDN–B, PDN–C and PDN–D. Individually associated with primary network PEN are two secondary equipment number networks, ESDH and ESDV illustrated in Figs. 6 and 7, respectively.

The primary network illustrated in Fig. 2 and also the one shown in Fig. 5 comprises a network of up to 10,000 linear, bilateral, passive electrical elements. By a "linear, bilateral, passive, electrical element" is meant an element in which the amplitude of current therethrough is linearly affected by the voltage applied across said element, but is not affected by the polarity of the applied voltage. Thus, for example, a resistor, an inductor, a capacitor or a network of these elements in combination is meant to be included within the definition of a linear, bilateral, passive, electrical element. It is understood that in this description and in the claims the expression "linear, bilateral, passive, electrical element" or "passive element" shall mean an element having the properties as above indicated.

Each passive element in the primary network PEN comprises two components (*a*) and (*b*) of Fig. 5 having a common terminal and outer terminals which are respectively connected to two conductors in two groups of 100 conductors each. For purposes of illustration these two groups of conductors are shown in Figs. 2 and 5 as disposed in coordinate arrangement, it being understood that the conductors in each group are insulated from each other and from the conductors in the other group. The conductors in the horizontal group of 100 conductors are designated from 00XX . . . 99XX while the conductors in the vertical group are designated XX00 . . . XX99. It may be seen that if a passive element is connected to a conductor in the horizontal group which has a particular thousands and hundreds numerical designation and to a conductor in the vertical group which has a particular tens and units designation, the passive element joining the two conductors will designate a four-digit number composed of the thousands and hundreds digit designation of the horizontal conductor to which the element is connected and the tens and units designation of the vertical conductor to which the element is connected. Thus, for example, passive element 4000 in Fig. 5 has the outer terminal of its component (*a*) connected to horizontal conductor 40XX and the outer terminal of its component (*b*) connected to vertical conductor XX00.

In the same manner each passive element is joined to a horizontal conductor and a vertical conductor in a primary network to designate a four-digit number. Since the primary network has a capacity of 10,000 numbers, a similar number of passive elements, each suitably connected to a horizontal and vertical conductor, will indicate each of the 10,000 numbers.

The "Equipment Termination" network comprises a capacitor C1 and resistor R1 connected as shown to the equipment number terminals. The "Directory Termination" network comprises in addition a resistor R2 connected to a "class" terminal in accordance with the class of service to which the station is entitled.

From the termination networks of each of the stations, a conductor is extended to the common terminal of the two components (*a*) and (*b*) of the appropriate passive element in network PEN in accordance with the equipment location number of the line, and also to one of the four primary networks PDN–A, PDN–B, PDN–C and PDN–D in accordance with the directory number of the station thereon. Thus conductor 1, associated with station A having the directory number 3847, joins a termination network connected to directory number terminal 3847 with the common terminal of passive element 3847 in primary network PDN–A (at the intersection of conductors 38XX and XX47). In a similar manner conductor 346 extends equipment number terminal 4000 from a termination network to the common terminal of passive element 4000 in primary network PEN. Thus, each station in the central office has a passive element in the involved primary network PDN corresponding to its directory number and a passive element in primary network PEN corresponding to the line on which the station is located. The conductors connected to lines of private branch exchange groups are similarly treated.

However, in contradistinction to the instance of the multiparty situation where one equipment number may have two or more directory number designations, in a P. B. X arrangement several equipment number designations may have only on directory number designation. Consequently, whereas with respect to a multiparty telephone situation only one passive element in primary network PEN is utilized to designate the associated equipment number, in the case of a P. B. X line group two or more passive elements in primary network PEN are used to represent the several equipment numbers associated with a single directory number. It may be pointed out that where each line of a private branch exchange group is to be charged for its own calls and therefore it is necessary to identify its own directory number upon the origination of each of such calls, connections are made to separate or individual termination networks and thence to separate passive elements in the primary networks PDN–.

Where, however, calls originating on the lines of a P. B. X group are to be charged to one line only, it then becomes necessary to identify only the number of the latter line upon the origination of a call from any line in the group. In this event, the directory number terminals of the P. B. X group are extended to a collector network (Fig. 1) comprising a resistor R3 for each station, which is connected in common to a grounded resistor R64 whence an identifying conductor 5 is then extended to a passive element in the appropriate directory number PDN–. In the arrangement shown in Fig. 1, the calls from the P. B. X lines are assumed to be charged to directory number 1100; accordingly, identifying conductor 5 is connected to passive element 1100 in primary network PDN–A.

Also associated with each of the primary networks PDN– and PEN are relay groups GR1 and GR2, controlled, for example, by a digit scanning circuit similar to that shown in Fig. 9 in the above-referred to Barlow-Crofutt patent, for grounding all primary bus bars not actually being scanned at a particular instant. This arrangement helps to prevent false operation of the identifier due to possible feedback of the identifying potential through the interconnected bus bars. Relay groups GR3 and GR4 are adapted to perform the same function in the secondary networks.

Different lines in an exchange are entitled to different classes of service. It is therefore necessary to determine the class of service to which a subscriber is entitled when he establishes a call, as well as his directory number. For this purpose there is provided a "class network" shown in Fig. 4 which is similar in arrangement to the primary networks. There is also provided a group of class terminals shown in Fig. 1 to which the termination network of each station entitled to the same class of service is connected. A class identifying conductor, for example conductor 6, is then used to connect the class terminal with the passive element in the class network which identifies said class by some digit or character indicative of the class.

Separate class terminals FRA, FRB, FRC and FRD are provided for the four directory number terminals connected to equipment number terminal 4000. These four class terminals represent separate connections to the class network for stations A, B, C and D. Although the four stations generally would receive the same class of service, for example, flat rate service, individual class connections are made to facilitate identification of the type of ringing current necessary to reach the party on incoming calls to the central office. Other class terminals (not shown) may be used for different service classes, for example, message rate, coin class, etc. In each instance where more than one party is connected to the same line, separate class terminals are afforded for each party to facilitate identification of the party and the type of ringing required.

Previously it has been pointed out that if a source of alternating-current potential is applied to the sleeve conductor SL of an extended connection, that potential becomes available on all identifying conductors, for instance, conductors 1, 2, 3 and 4 severally connected to the termination networks of the stations on the line L. The potential also is available, in the case of line L, on conductor 346 which is connected to a corresponding passive element in primary network PEN. It may be seen from the above that said potential will be extended in each network connected to said identifying conductors, to the pair of vertical and horizontal conductors therein to which the associated passive element is connected. Since the party identification of the calling station on the line is determined by the operation of one of four relays A, B, C or D of the party register, as previously noted, the potential thus made available at each pair of conductors in each of primary networks PDN could be used, if desired, to activate suitable responsive apparatus under the control of the operated party register relay to provide an indication of the directory number of the calling station.

At the same time the conductor extending from the equipment number terminal to a passive element in primary network PEN will activate a pair of horizontal and vertical conductors connected to said passive element, which again if desired, may activate associated responsive apparatus to provide an indication of the equipment number of the calling station.

Information in a one-out-of-ten thousand code, however, requires complex apparatus to transmit and record, making it desirable to compress the code. In this case, the individual directory numbers and equipment numbers are translated to a two-out-of-five code. Since the two-out-of-five code requires but five code conductors for each digital order of the directory number, twenty code conductors (five for each digital order) are required to transmit a four-digit directory number and another twenty code conductors are required to transmit a four-digit equipment number identification for each one of 10,000 stations.

In the two-out-of-five code, any digital value from 0 to 9 is expressed by the energization of two, and only two, out of a group of five conductors or other elements. Each of the elements is given a numerical designation such that, for each digital value except 0, the sum of the designation of the two conductors, or elements, activated to express a digital value, indicates that value. The code is as follows:

| Digital Value | Code Conductors or or Other Elements and Their Designation |
|---|---|
| 1 | 0,1 |
| 2 | 0,1 |
| 3 | 1,2 |
| 4 | 0,4 |
| 5 | 1,4 |
| 6 | 2,4 |
| 7 | 0,7 |
| 8 | 1,7 |
| 9 | 2,7 |
| 0 | 4,7 |

An inherent advantage of the two-out-of-five code shown in the embodiment is that each digital value is expressed by two elements of the code, and only two, such that if more or less than two elements are activated, an error is recognized.

In order to compress the directory and equipment numbers into the two-out-of-five code, secondary networks SDV and SDH are provided for each primary network PDN–, and secondary networks ESDV and ESDH are provided for primary equipment number network PEN. In each instance the secondary networks SDH and ESDH are used to express the thousands and hundreds digit of the identified number in the two-out-of-five code and the secondary networks SDV and ESDV are used to express the tens and units digit of the number in the two-out-of-five code. Figs. 3 and 6 show in detail the secondary networks SDH and ESDH associated with the primary networks PDN–A and PEN, respectively. It is understood that a similar pair of secondary networks SDH and SDV is provided for each of the other three primary networks PDN–B, PDN–C and PDN–D as indicated in the lower portion of Fig. 3. Each of the secondary networks comprises two groups of ten pairs of conductors, one group of ten pairs being shown in Fig. 3 in vertical alignment to indicate the ten values 0XXX . . . 9XXX of the thousands digit, the other group of ten pairs being shown in horizontal alignment to indicate the ten values X0XX . . . X9XX of the hundreds digit.

The two vertical conductors 0XXX, for example, are extended to the two code conductors 4 and 7 of the five code conductors 0, 1, 2, 4 and 7 included within the bracket TH, to indicate the "0" value of the thousands digit, while each of the other pairs of vertical conductors 1XXX . . . 9XXX are similarly extended to the particular two-out-of-five code conductors within the bracket TH in accordance with the code representation of each of the other nine values of the thousands digit.

In the same manner the two horizontal conductors X0XX, for example, are connected to two code conductors 4 and 7 within the bracket H to indicate the "0" value of the hundreds digit, while the other pairs of horizontal conductors are similarly extended in accordance with the code representation of the digital value.

To each pair of vertical conductors is connected ten pairs of passive linear elements, each pair of said elements having a common terminal, each pair being individual to each directory number having the same thousands digit but a different one of the ten values of the hundreds digit. Connected to each pair of horizontal conductors are ten pairs of similar passive elements, each pair of said elements being joined at the common terminal with the pair connected to the vertically crossing (but insulated) conductors, one pair being individual to each directory number having the same hundreds digit but a different one of the ten values of the thousands digit.

For example, in Fig. 6 passive element 40XX, comprising four components with a common terminal, has its two horizontal components connected to the vertical conductors 4XXX and its two vertical components connected to the horizontal conductors X0XX. Element 40XX, therefore, is individual to all equipment numbers having the thousands digit "4" and the hundreds digit "0." It is evident from Fig. 6 that the ten passive elements each having their two horizontal components connected to the pair of vertical conductors 4XXX will each be individual to equipment numbers having the thousands digit "4" and that the ten passive elements each having their two vertical components connected to the pair of horizontal conductors X0XX will each be individual to equipment numbers having the hundreds digit "0." The same arrangement is followed with respect to each of the other passive elements and each of the other pairs of conductors shown or indicated in the secondary network ESDV of Fig. 7, SDV of Fig. 4 and SDH of Fig. 3.

Thus the secondary networks SDH and ESDH form 100 squares, each square bounded by the crossing of two of the ten pairs of vertical and horizontal conductors, the enclosure of each square containing a four-component passive element whose two horizontally disposed elements are connected to the pair of vertical conductors to designate the thousands digit of a directory or equipment number, while its two vertically disposed components are connected to the pair of horizontal conductors to designate the hundreds digit of the number. However, since there are ten horizontally disposed passive elements between the same pair of vertical conductors, it follows that each of said pairs designates a number which has the same numerical value for its thousands digit, and since there are ten vertically disposed elements connected to the same pair of horizontal conductors, it further follows that each of said pairs designates a number having the same value for its hundreds digit.

It may be seen that since each pair of vertical conductors 0XXX . . . 9XXX is connected to a pair of the code conductors 0, 1, 2, 4 and 7 within the bracket TH in accordance with the code representation of each of the ten values of the thousands digit, the electrical activation of any pair of vertical conductors by the application of a potential thereto from the common terminal of the passive element within the square will result in the electrical activation of the two code conductors to which said pair of vertical conductors is connected, thereby to indicate the thousands digit represented by said pair of vertical conductors in the two-out-of-five code.

The horizontal conductors are similarly arranged. The activation of a pair of code conductors 0, 1, 2, 4 and 7 within the bracket H indicates the particular value in the two-out-of-five code of the hundreds digit of the passive element to which the potential is applied. Thus if a potential is applied to the common terminal of the element within a square formed by two vertical and two horizontal conductors, one pair of code conductors 0, 1, 2, 4 and 7 within bracket TH will be activated to indicate the code of the thousands digit value represented by the enclosing pair of vertical conductors and one pair of code conductors 0, 1, 2, 4 and 7 within the bracket H will be similarly activated to indicate the code of the hundreds digit value representing the enclosing pair of horizontal conductors. In the case of the passive element 40XX of Fig. 6 for example, a potential applied to the common terminal thereof will cause the activation of the code conductors 0 and 4 within the bracket TH and code conductors 4 and 7 within the bracket H indicating the thousands digit 4 in the two-out-of-five code and the hundreds digit 0 in the same code, respectively.

The arrangements of passive elements in the secondary networks SDV and ESDV, Fig. 4 and Fig. 7, respectively, which are reserved for the indication of all tens and units digits of directory and equipment numbers respectively, are arranged in a manner similar to that of primary networks ESDH and SDH. In each of the 100 squares formed by the ten pairs of vertical conductors XX0X . . . XX9X and the ten pairs of horizontal conductors XXX0 . . . XXX9 is connected a four-component passive element, for example, element XX00 of Fig. 7. In this case, the two horizontally disposed components are connected to the pair of vertical conductors XX0X to indicate an equipment number having the tens digit 0, and the two vertically disposed components are connected to the pair of horizontal conductors XXX0 to indicate an equipment number having the units digit 0. Since the ten pairs of vertical conductors XX0X . . . XX9X are connected to the code conductors 0, 1, 2, 4 and 7 within the bracket T, and the ten pairs of horizontal conductors XXX0 . . . XXX9 are connected to the code conductors 0, 1, 2, 4 and 7 within the bracket U, the application of a potential to the common point of the element XX00 will activate code conductors 4 and 7 within bracket T to indicate the tens digit "0" in the two-out-of-five code, and the code conductors 4 and 7 within the bracket U to indicate the units digit "0" in the same code.

The connection between a primary network PDN– or PEN and the associated secondary networks SDH and SDV or ESDH and ESDV, respectively, is established by (1) extending the horizontal conductors 00XX . . . 99XX of a primary network severally to the common terminals of the passive elements of the associated secondary network SDH or ESDH in accordance with the thousands and hundreds numerical designation of the conductors and those of said passive elements, and (2) extending the vertical conductors XX00 . . . XX99 of the primary networks PDN– and PEN severally to the common terminals of the passive elements of the associated secondary networks SDV and ESDV in accordance with the identity of the tens and units numerical designation of the conductors and those of said passive elements.

Considering, for example, primary networks PEN and its two associated networks ESDH and ESDV, horizontal conductor 40XX in said primary network is connected to the common terminal of passive element 40XX in the secondary network ESDH, other horizontal conductors —XX from said primary networks PEN being similarly extended to other passive elements in said secondary network ESDH. Similarly, vertical conductor XX00 from primary network PEN is connected to the common terminal of passive element XX00 in secondary network ESDV, other vertical conductors XX— from said primary network being similarly extended to passive elements in secondary network ESDV.

The described relationship between the primary network PEN and its associated networks ESDV and ESDH is illustrative of an identical relationship between the remaining primary networks PDN– and their associated secondary networks. It may be seen that a signal potential furnished over a horizontal conductor —XX of the primary network to the common terminal of a similarly designated passive element in the secondary network ESDH or SDH will furnish code indications of a directory number or equipment number having the thousands digit value indicated by the thousands digit designation of the pair of vertical conductors in the secondary networks ESDH or SDH to which the two horizontal components of said element are connected, and a hundreds digit value indicated by the hundreds digit designation of the pair of horizontal conductors in said secondary networks to which the two vertical components of said element are connected. Similarly, a signal potential applied over a vertical conductor XX— to the common terminal of the similarly designated element XX— in the secondary network ESDV or SDV will furnish tens and units digit code indication of a directory or equipment number having the tens digit value indicated by the tens digit designation of the pair of vertical conductors to which the two horizontally disposed components of said element are connected, and the units digit value indicated by the units digit designation of the pair of horizontal conductors to which the two vertically disposed components of said element are connected.

The two-out-of-five conductors 0, 1, 2, 4 and 7 of the thousands, hundreds, tens and units digits shown in Figs. 3, 4, 6 and 7 are connected to suitable responsive apparatus (not shown) for indicating the directory or equipment number represented by the code. As indicative of the apparatus which may be advantageously used in conjunction with the present invention reference may be made to the above-mentioned patent to D. S. Barlow and G. B. Crofutt, Jr. which is herewith incorporated by reference.

When a call is initiated from station A, line L is extended in the usual manner over switches LS1 . . . LSX to the trunk TR, the magnets of the switching train being held operated by ground over the normal contacts of relay SIG. After the office code of the called station is dialed and registered in the registers of the sender (not shown), said sender determines from this code that the call requires the recording of the directory and/or equipment number of the calling station. Relay CI is then operated in any suitable manner, whereupon the tip and ring conductors T and R of the trunk are switched to the station identification circuit SIC, which then operates to determine the identity of the calling station in the manner described in the above-mentioned patent to M. A. Logan. Since the call was placed at station A, circuit SIC, as a consequence of the test it makes over the line L, causes the operation of relay A of the party register, which relay locks over its locking winding under the control of an off-normal ground ON, and applies ground to conductor 7, which in turn extends to an input gate circuit IPG shown in box form in Fig. 1. The function of circuit IPG, explained in detail in the above-referred to Barlow-Crofutt patent, is to energize the responsive apparatus for the particular network PDN– on which the calling station is represented. Further operations which will not be described in detail herein as they are not essential to an understanding of the present invention may be performed in accordance with the teachings of the above-mentioned Barlow-Crofutt patent, for example, to complete a circuit from the oscillator OSC to the sleeve conductor SL through contacts of relay SIG over conductor 46, after a check of sleeve impedance by circuit SCK over conductor 15. Reference to Figs. 5–10 of the above-referred to Barlow-Crofutt patent may be made for an examination of suitable apparatus.

The oscillator may be of any suitable construction. It should have a low impedance and be adapted to generate a high-frequency current. This frequency should be higher in frequency than that of the noise which, being generally within the limits of 1 to 10 kilocycles, suggests that the oscillator frequency might be 30 kilocycles by way of example. The characteristics of the oscillator OSC, the constants of the termination network connected to each of the directory number terminals and the constants of the passive elements in the primary networks PDN– and PEN bear a relationship to each other which is best explained by consideration of the circuit diagrams shown in Figs. 8 and 9, the former schematically indicating the electrical conditions on the sleeve conductor SL of a line L for example, while the latter indicates the relationship between the oscillator OSC and the passive elements of a primary network PDN–.

In a switching train of an extended connection as, for example, in an exchange which employs crossbar switches, the switch train comprises a number of switches each of which, after being operated to extend the line, is held in an operated position by a magnet connected to battery and by a ground applied to the sleeve conductor SL. The lines that are normal on the other hand, have the magnet of the first switch normally connected to their respective sleeve conductors. This is shown in Fig. 8. All of the sleeve conductors in the exchange are, of course, extended over conductors to the equipment number terminals, and to the appropriate passive networks in primary network PEN, as previously explained.

When the identifying signal is to be applied by the oscillator OSC to the sleeve conductor SL of the extended connection, the ground holding the magnets of the switch train at the normal contacts of relay SIG is replaced on the operation of said relay by ground through the inductance IND. The resistance of this inductance should be low to provide sufficient current to hold the magnets of the connection train in an operated condition.

The presence of battery through the magnets on the sleeve conductor SL of the lines in a non-calling condition, and the fact that all the sleeve conductors in the exchange are interconnected through the horizontal and vertical conductors of the primary networks PDN– and PEN requires that the termination network connected to each of the directory and equipment number terminals be provided with a capacitor C1 to prevent the establishment of battery current drain circuits through each of the magnets, conductor SL and termination resistors R1.

Previously it was noted that the oscillator OSC should have a low impedance. The reason for this is that the impedance of said oscillator must substantially match the impedance of the termination element R1 which must itself be low to prevent any appreciable signal potential from being applied to horizontal and vertical conductors of a primary network other than the two conductors therein the which element XXXX marking the directory or equipment number of the station to be identified is connected. Under these circumstances and considering that the impedance of each of the passive elements must be high in comparison with the termination impedance R1, the quantity of signal potential available at the two horizontal and vertical conductors of the primary network to which the passive element of the station is connected is high, while that which is available on other conductors of the network is low, thereby providing at each of said latter conductors a quantity of signal potential which is ineffective to actuate the responsive apparatus.

Fig. 9 indicates an abbreviated portion of the primary network PDN– to illustrate the distribution of signal potential. In this figure the oscillator OSC is shown on the location of the termination impedance R1 while the components *a* and *b* of the station element 3847 are shown connected respectively to the vertical conductor XX47 and the horizontal conductor 38XX. Along the vertical conductor XX47 are connected the components *a* of other elements XX47, said elements connecting with their respective termination impedances R1 to ground but for which, with respect to element 3847, the oscillator OSC has an equivalent impedance shown in place thereof. Component *b* of element 3847 as well as components *b* of all elements representing stations, the thousands and hundreds digits of whose directory numbers begin with 38 are connected to horizontal conductor 38XX.

For exemplary purposes, it may be assumed that the termination impedance R1 is 100 ohms (the impedance of the oscillator OSC being also in the order of 100 ohms), the impedance of each component *a* and *b* of element XXXX is 10,000 ohms and that the signal potential is applied at the common terminal of an element XXXX, for instance element 3847. The quantity of potential available on vertical conductor XX47 is largely controlled by the number of elements A connected to vertical conductor XX47. Besides component *a* of 3847 there are 99 other elements *a* connecting conductor XX47 to 99 corresponding terminating resistors R1 each of which connects to ground. Signal potential applied to terminal 3847 passes through one 10,000-ohm element *a* to vertical conductor XX47 and thence in parallel through 99 10,000-ohm combinations of element *a* and resistor R1 to ground. The signal potential on vertical conductor XX47 is therefore slightly over one-hundredth of the signal applied at terminal 3847. This is the signal which is delivered to a secondary network and thereafter to other circuits to identify the tens and units digits.

In the same way, about one-hundredth of the applied signal potential is delivered on horizontal conductor 38XX. The signals on busses XX47 and 38XX are, in this example, the wanted signals, and the factor one one-hundredth may be called the forward transmission of the primary network. The transmission of the signal from conductor XX47 to any one of the 99 terminals XX47 other than terminal 3847 is determined roughly by the ratio of the impedances of termination R1 and element *a*. In this example, the ratio is 100 ohms to 10,000 ohms and the transmission is about one one-hundredth. This factor may be called the backward transmission of the primary network and the signals on all terminals XX47 other than terminal 3847 are the unwanted signals.

The unwanted signals are in no way distinguishable from the wanted signals, and will act on the primary network in the same manner except that an unwanted signal is smaller than a wanted signal by the product of the forward and backward transmission, which in this example is one ten-thousandth.

The primary networks PDN– and PEN are thus arranged such that the small termination impedance R1, in comparison with the larger impedance of each of the components *a* and *b* of a passive element, will effectively attenuate backward transmission through the network, rendering signal transmission substantially unilateral. Therefore, although interconnected, the effect on other vertical or horizontal conductors by a signal applied to a particular conductor is minimal and, in this case, insufficient in magnitude to actuate the responsive apparatus. In addition, the embodiment shown presumes an arrangement such as relays GR1 and GR2, for example, for grounding all of the primary conductors not actually being used for the identification of the particular digit being examined by the identifier, thus obtaining a further signal-to-noise gain of 10 to 1. An embodiment of such an arrangement is fully disclosed in the above-mentioned patent of D. S. Barlow and G. B. Crofutt, Jr.

In the same manner, and by substantially similar arrangements as provided for the primary networks PDN and PEN, the passive elements in the secondary networks function likewise to provide good forward transmission and poor backward transmission through the network, with the result that the code conductors, although interconnected by the secondary network remain substantially isolated electrically.

It may be seen that a signal potential available at C1—R1 of Fig. 1 and transmitted over conductor 346 to passive element 4000 in Fig. 5 is further transmitted over component *a* and conductor 40XX to the center terminal of the four-element resistor 40XX of secondary network ESDH (Fig. 6). In a similar manner and over component *b* of passive element 4000, a portion of said signal is transmitted over conductor XX00 to the common terminal of the four-element resistor XX00 of secondary network ESDV (Fig. 7).

That part of the signal potential which is available at the outer terminals of the two horizontal elements of resistor 40XX is made available on the code conductors 0 and 4 within the bracket TH of the secondary networks ESDH, which potential is available for detection by suitable responsive apparatus, for example, apparatus shown in the above-mentioned patent of D. S. Barlow and G. B. Crofutt, Jr. In the same manner, the signal potential available at the outer terminals of the vertical elements of resistor 40XX are joined through conductors X0XX to code conductors 4 and 7 within the bracket H of secondary network ESDH.

Further, the signal potential applied to the common terminal of the four-element resistor XX00 in secondary network ESDV results in the application of a part of said potential to code conductors 4 and 7 within the bracket T and to code conductors 4 and 7 within the bracket U.

Having thus generally described the apparatus comprising the invention, the description of its operation now follows:

Assume in the first instance that the invention is to be utilized in its capacity as a called directory number to equipment number translator. In this case the directory number of a given subscriber station is known from the sender into which said number has been dialed. It is necessary to determine the corresponding called line equipment number. Assume that the known directory number is 3847. The translation process is commenced by selectively operating the relays DC from the called number registers of the sender to apply a direct-current voltage to all of the primary network busses of primary network PDN–A, except those connected to the coupling network of the directory number sought to be translated. This direct-current voltage will act to fire all of the gas tube diodes GT to ground except the diode GTA connected to the mid-point of the passive element 3847. If, now, an alternating-current tone signal in the range of 30 kilocycles, for example, is applied to either one or the other of the two primary busses 38XX or XX47 by actuating the approporiate relay AC, the tone will be transmitted through the passive element 3847, conductor 1, condenser C1, directory number terminal 3847, equipment number terminal 4000, condenser C1, conductor 346 to passive element 4000 of primary network PEN. The tone thus appearing on said element may be traced and detected in the manner hereinabove set forth and the decimal designation of the equipment number corresponding to directory number 3847 established.

It may be seen that the application of the alternating-current tone to a bus connected to passive element 3847 cannot result in the transmission of any substantial signal through conductors other than conductor No. 1 in view of the voltage regulator action of the fired gas tubes which, from an alternating-current standpoint, is equivalent to substantially a direct ground placed at the center terminals of all other passive elements in the network PDN–A, thereby shunting any spurious currents which may so appear.

The simultaneous identification of both equipment and directory number of a calling station by application of a signal to the sleeve conductor have previously been explained.

The present embodiment also provides a method of selecting an idle private branch exchange line. To accomplish this a gas tube diode GT has been provided for each private branch exchange line and connected between the mid-point of the passive element in primary network PEN individual to the equipment number of the line and ground, as shown in Fig. 5. Tone may be applied to the P. B. X directory number of the P. B. X group at the passive element 1100 of Fig. 2 (assumed to be the directory number) in a manner similar to that of element 3847. As described above, all other paths being shunted to ground, the tone will travel over conductor 5, through the collector network resistors R3, directory number terminals, equipment number terminals 1000, 1001 and 1047, and thence over conductors 343, 344 and 345 to passive elements 1047, 1001 and 1000, respectively, in primary network PEN.

Tone may now be detected on several horizontal and vertical conductors in primary network PEN and their corresponding conductors in the secondary networks ESDH and ESDV. All horizontal conductors in primary network PEN are grounded by operation of relays GR1. Secondary network ESDV may now be traced for conductors bearing tone which in this case will include conductors XX0X, XX4X, XXX0, XXX1 and XXX7. A pair of horizontal and vertical conductors of secondary networks ESDV are now arbitrarily selected, for example, XX4X and XXX7. Direct-current voltage is then applied to the remaining conductors in secondary network ESDV through selective operation of relays DC2. As a result all gas tubes GT in Fig. 5 connected to vertical conductors other than vertical conductor XX47 are ionized and fired to ground. Subsequently relays GR1 are deenergized and relays GR2 are energized. Network ESDH may now be traced in the conventional manner explained above for horizontal and vertical conductors bearing tone. In this instance only conductors 1XXX and X0XX (neither of which are shown) will bear tone. Assuming for the purposes of explaination that other horizontal and vertical conductors in secondary network ESDH are bearing tone, an arbitrary choice of conductors 1XXX and X0XX will be made. All other conductors are subjected to a direct-current signal by selective operation of relays DC2. This occasions the firing of all gas tubes GT in the primary network PEN which are not connected to horizontal conductor 10XX. As a result, only one gas tube GT at the intersection of horizontal conductor 10XX and vertical conductor XX47 remains unfired. The equipment number of this idle private branch exchange line may now be read as in the non-private branch exchange case.

It is understood that the above-described arrangements are illustrative of the application of the principles of the invention. Numerous other arrangements may be devised by those skilled in the art without departing from the spirit and scope of the invention.

What is claimed is:

1. A translator for use in telephone systems comprising in combination a first and second coordinate array of conductors, the conductors in each array being joined by electrical elements at their crosspoints, each of said elements expressing a numerical designation, a plurality of subscribers' lines individually connected to at least one element in each of said arrays in accordance with the numerical designation of said lines, and means for energizing a selected element in said second array, including means responsive thereto for energizing the corresponding element in said first array connected to the same line as said selected element.

2. A translation device for use in telephone systems comprising in combination a first and second coordinate array of conductors, the conductors in each array being joined by electrical elements at their crosspoints, each of said elements expressing a numerical designation, a plurality of lines individually connected to at least one element in each of said arrays in accordance with the code designations of said lines in the respective array, means for energizing a particular element connected between two conductors in said second array including means for grounding the remainder of the elements therein and including means for applying a signal frequency to one of said conductors connected to said element to be energized, and means in said first array for detecting said signal in said element in said first array connected to said energized element in said second array.

3. In a telephone system comprising subscribers' stations and lines, each station having an individual directory number and an individual equipment number, means for identifying said equipment number when said directory number is known, said means comprising a first and second coordinate array of conductors, the conductors in each array being joined by electrical passive elements at their crosspoints, each of said elements in said second array expressing a directory number, each of said elements in said first array expressing an equipment number, said subscribers' lines being connected to said elements in said arrays in accordance with their respective directory and equipment numbers, means in said second array for applying a high-frequency signal to one of the conductors connected to the element designating the known directory number of which the corresponding equipment number is desired, means for grounding the mid-points of the remainder of said passive elements in said second array, and means in said first array for detecting said high-frequency signal and for identifying the element in said first array connected to the element in said second array to which the high-frequency signal has been applied.

4. An identifier for ascertaining the equipment number designation of each of a plurality of telephone stations from the directory number of each of said stations, each directory number and each equipment number comprising four digits, including a first and second coordinate array of conductors, the conductors in said second array including two groups of one hundred paths, one of said groups being disposed horizontally and designating the thousands and hundreds digits of said directory number, the other of said groups being disposed vertically and designating the tens and units digits of said directory number, the conductors in said first array including two groups of one hundred conductive paths, one of said groups being disposed horizontally and designating the thousands and hundreds digits of said equipment number, the other of said groups being disposed vertically and designating the tens and units digits of said equipment number, the conductors in each array being joined by passive electrical elements at their crosspoints, each of said stations being connected to at least an element in each of said arrays, each of said elements in said second array expressing the four digits of the directory number of the station to which said element corresponds, each of said elements in said first array expressing the four digits of the equipment number of the station to which said element corresponds, means in said second array for applying a high-frequency signal to one of said passive elements therein in accordance with the directory number to be translated, means for grounding the remaining passive elements in said second array and means in said first array for ascertaining the element therein at which said signal is rendered effective, said element expressing the desired equipment number.

5. An identifier translator comprising in combination a first and second coordinate array of conductors, the conductors in each array being joined by electrical elements at their crosspoints, each of said elements expressing a numerical designation, a plurality of lines individually connected to at least one element in each of said arrays in accordance with a code expressing its numerical designation, means for energizing any one of said lines, means responsive to the operation of said last-mentioned means for energizing the elements to which said line is connected, and means for identifying the energized elements in each of said arrays, thereby to ascertain the code designations of said elements.

6. An identifier for ascertaining the directory number and equipment number designations of each of a plurality of telephone stations in a telephone system, each of said stations having a four-digit directory number and a four-digit equipment number, said identifier comprising a first and second coordinate array of conductors, each of said arrays including two groups of one hundred conductive paths, one of said groups in each array being disposed horizontally to respectively designate the thousands and hundreds digits of the directory numbers and equipment numbers, the other of said groups being disposed vertically to respectively designate the tens and units digits of said numbers, the conductors in each array being joined by electrical passive elements at their crosspoints, each of said elements in said first array expressing an equipment number, each of said elements in said second array expressing a directory number, said stations being connected to at least one element in each of said arrays in accordance with the assigned directory and equipment numbers, means responsive to the initiating of a call on any of said stations and means responsive to a potential applied by the operation of said call indication responsive means to the passive elements to which said calling station is connected for producing a group of signals indicative of the directory and equipment numbers of said calling stations.

7. A translator for the lines and stations of a telephone system, each of said stations having an individual directory number and each of said lines having an equipment location number, a first device responsive to a calling condition in one of said stations for ascertaining the directory number of said calling station and the equipment location number of the line in which said station is located, means settable according to the directory number of one of said stations when called, a second device, and means responsive to the operation of said settable means for jointly operating said first and said second devices for ascertaining the equipment location number of the line on which said called station is located.

8. An identifier translator for ascertaining the designations of telephone stations in a telephone system, comprising in combination a first and second coordinate array of conductors, each of said arrays including two groups of one hundred conductive paths, one of said groups being disposed in a horizontal array with each path therein designating a pair of thousands and hundreds digits of the designations of said stations, the other of said groups being disposed in a vertical array with each path therein designating a pair of tens and units digits of the designations of said stations, the conductors in each array being joined by electrical elements at their crosspoints, each of said elements expressing a numerical designation related to the conductors to which it is connected, means connecting each of said stations to at least one of said elements in each of said arrays in accordance with a code, means for applying a high-frequency signal to two selected conductors in said second array, means for grounding all the elements in said second array except the one element joining the two selected conductors, means in said first array responsive to the application of said high-frequency signal for detecting the conductors in said second array to which the signal is applied, thereby to identify the passive element in said first array connected to said element in said second array joining said two selected conductors.

9. An identifier translator for ascertaining the directory and equipment numbers of telephone stations in a telephone system, comprising a first and second coordinate array of conductors, said second array including two groups of one hundred conductive paths, one of said groups being disposed horizontally to designate pairs of thousands and hundreds digits of said station directory numbers, the other of said groups being disposed vertically to designate pairs of tens and units digits of said station directory numbers, said first array including two groups of one hundred conductive paths, one of said groups being disposed horizontally to designate pairs of thousands and hundreds digits of said station equipment numbers, the other of said groups being disposed vertically to designate pairs of tens and units digits of said station equipment numbers, each horizontal and vertical conductor in each array being joined by passive electrical elements at their crosspoints, each of said elements in said second array representing a particular directory number, each of said elements in said first array expressing a particular equipment number, means connecting each of said stations to at least one of said elements in each of said arrays, means for applying a high-frequency signal to two selected conductors joined by a particular element in said second array, means for grounding the remaining elements in said second array, means in said first array responsive to the application of said high-frequency signal for identifying the passive element in said first array connected to said element in said second array joining the two selected conductors, means responsive to one of said stations when calling for applying a high-frequency signal to certain conductors in said second array, thereby to activate the passive element expressing the directory number of said calling station, and means in said first array responsive to the activation of said passive element for activating the passive element expressing the equipment number of the station connected to said element.

10. An identifier translator for determining the directory and equipment numbers of telephone stations in a telephone system, comprising a first and second coordinate array of conductors, said second array including two groups of one hundred conductive paths, one of said groups being horizontally disposed to designate pairs of thousands and hundreds digits of said station directory numbers, the other of said groups being vertically disposed to designate pairs of tens and units digits of said station directory numbers, said first array including two groups of one hundred conductive paths, one of said groups being horizontally disposed to designate pairs of thousands and hundreds digits of said station equipment numbers, the other of said groups being vertically disposed to designate pairs of tens and units digits of said station equipment numbers, each horizontal and vertical conductor in each array being joined by passive electrical elements at their crosspoints, each of said elements in said second array representing a particular directory number, each of said elements in said first array expressing a particular equipment number, means connecting each of said telephone stations to at least one of said elements in each of said arrays, a gas diode connecting each of said elements in said second array to ground, means for applying a high-frequency signal to two selected conductors in said second array, means for ionizing the gas diodes in said second array other than the one connected to the passive element joining the two selected conductors, and means in said first array responsive to the application of said high-frequency signal for activating the passive element therein which is connected to said element in said second array joining the two selected conductors.

11. A translation device for use in telephone systems comprising in combination a first and second coordinate array of conductors, the conductors in each array being joined by electrical elements at their crosspoints, each of said elements expressing a numerical designation, a plurality of telephone lines individually connected to at least one element in each of said arrays in accordance with the code designations of said lines in the respective arrays, means for energizing a particular element connected between two conductors in said second array including means for grounding the remainder of said elements in said second array and including means for applying a signal frequency to one of said conductors connected to said energized element, means in said first array for detecting said signal in said elements in said first array connected to said energized element in said second array, and means for selecting one of said energized elements in said first array including means for selectively grounding all of said energized elements other than the selected element.

12. An identifier for determining the equipment number of an idle private branch exchange line, including a first and second coordinate array of conductors, the conductors of each array being joined by electrical elements at their crosspoints, each of said elements expressing a numerical designation, a plurality of subscribers' lines individually connected to at least one element in each of said arrays in accordance with the code designation of said lines in their respective arrays, a gas diode connected to each of said elements in said first array expressing a numerical designation representative of a private branch exchange equipment number, means for energizing a particular element connected between two conductors in said second array including means for grounding the remainder of the elements therein and including means for applying a signal frequency to one of said conductors connected to said element to be energized, means in said first array for detecting said signal in said elements connected to said energized element, means for selecting a particular energized element in said first array expressing an idle private branch exchange line equipment number including means for successively and selectively grounding all of the energized elements in said first array other than the selected element in said first array, and means for identifying said selected element.

13. An identifier translator for use in telephone systems comprising a first and second coordinate array of conductors, the conductors in each array being joined by passive electrical elements at their crosspoints, each of said elements expressing a numerical designation, a plurality of subscribers' lines individually connected to at least one element in each of said arrays in accordance with the code designations of said lines in the respective arrays, means for energizing a particular element connected between two conductors in said second array including means for grounding the remainder of said elements in said second array and including means for applying a signal frequency to one of said conductors connected to said energized element, means in said first array for detecting said signal in said elements in said first array connected to said energized element, and means connected to said subscribers' lines for identifying the type of ringing current required to ring said subscribers' stations.

No references cited.